United States Patent
Saito (10) Patent No.: US 7,724,775 B2
(45) Date of Patent: May 25, 2010

(54) DATA TRANSMISSION CIRCUIT AND METHOD FOR CONTROLLING THE DATA TRANSMISSION CIRCUIT

(75) Inventor: Yuji Saito, Yamanashi (JP)

(73) Assignee: NEC Computer Techno, Ltd., Kofu-shi, Yamanashi (JP)

( * ) Notice: Subject to any disclaimer, the term of this patent is extended or adjusted under 35 U.S.C. 154(b) by 497 days.

(21) Appl. No.: 11/704,245

(22) Filed: Feb. 9, 2007

(65) Prior Publication Data

US 2007/0189296 A1 Aug. 16, 2007

(30) Foreign Application Priority Data

Feb. 10, 2006 (JP) ............................. 2006-033829

(51) Int. Cl.
H04J 3/24 (2006.01)
H04J 3/04 (2006.01)

(52) U.S. Cl. .................................... 370/474; 370/535

(58) Field of Classification Search ................ None
See application file for complete search history.

(56) References Cited

U.S. PATENT DOCUMENTS 6,003,089 A * 12/1999 Shaffer et al. ............... 370/232
7,209,489 B1 * 4/2007 Bailey et al. ................ 370/412
7,305,486 B2 * 12/2007 Ghose et al. ................ 709/232
7,373,449 B2 * 5/2008 Radulescu et al. .......... 710/316
2003/0133463 A1 * 7/2003 Lacey, III ................... 370/411
2004/0205270 A1 * 10/2004 Creta et al. ................. 710/100
2004/0240460 A1 * 12/2004 Hwang et al. .............. 370/412

FOREIGN PATENT DOCUMENTS

| JP | 59-81947 | 5/1984 |
| JP | 64-81551 | 3/1989 |
| JP | 4-276948 | 10/1992 |
| JP | 6-225103 | 8/1994 |
| JP | 11-234347 | 8/1999 |
| JP | 2004-32283 | 1/2004 |

OTHER PUBLICATIONS

Japanese Office Action dated Jun. 2, 2009 with Partial English Translation.

* cited by examiner

*Primary Examiner*—Steven H Nguyen
(74) *Attorney, Agent, or Firm*—McGinn IP Law PLLC (57) ABSTRACT

A circuit connected to a data transmission path, said circuit comprising, a merge element which generates merged data by merging a plurality of incoming data; and a controller which transmits said merged data through said data transmission path when said data transmission path comes open.

8 Claims, 9 Drawing Sheets

DATA TRANSMISSION CIRCUIT AND METHOD FOR CONTROLLING THE DATA TRANSMISSION CIRCUIT

BACKGROUND OF THE INVENTION

The present invention relates to a data transmission circuit, and a data transmission method. In particular, the present invention relates to a data mission circuit, and a data transmission method, which are used for controlling a transmission of reply data responding to a read request between processing units.

Generally, when data are transmitted between processing units, a header including information on destination and the like is added to the data to be transmitted. Then, the data are collectively transmitted as a packet. When the packet transmitted, the packet is divided into a plurality of flits. Then each of the flits is transmitted in synchronism with a clock cycle. Here, a flit is a minimum unit of data which can be transmitted in one clock cycle. Typically, a size of a flit ranges approximately from 8 bits to 64 bits.

When a maximum data length which can be handled by a processing unit A (for example, 128 Bytes) is smaller than that of a processing unit B (for example, 4 kBytes), the data transmission circuit located therebetween typically performs as follows. When data are transmitted from the processing unit B to the processing unit A, the data transmission circuit divides the data into pieces each having a data length which can be handled by the processing unit A. On the other hand, when data are transmitted from the processing unit A to the processing unit B, the data transmission circuit merges the data, and transmits the merged data to the processing unit B. Descriptions will be given below of a case where a read request is issued from the processing unit B to the processing unit A, and then reply data is transmitted from the processing unit A in response to the read request, for example. The data transmission circuit divides a packet of data including information on the read request to transmit the packet to the processing unit A. Moreover, the data transmission circuit merges all the reply data corresponding to the read request, or merges part of the reply data which part includes a predetermined number of flit. Then the data transmission circuit transmits the merged data to the processing unit B. In the data transmission circuit of a conventional technique, the number of flit to be merged is determined in advance. Accordingly, even when a transmission path to the processing unit B is available, it is necessary to wait for completion of the merging of the reply data. For this reason, the transmission path cannot be efficiently used, and thereby the throughput is lowered.

Examples relating to a packet transmission method are disclosed in the following conventional techniques.

In Japanese Patent Application Laid-Open No. 01-081551, a packet transmission method using a transmission apparatus and a receiving apparatus is described as follows. In the packet transmission method, the transmission apparatus combines a plurality of data in a range that a total length of the combined data is not exceeding a packet length determined in advance, and transmits the combined data as a packet. Information on a length of the data is added to each packet. The receiving apparatus separates data included in the packet by using the information added to the packet. Moreover, in Japanese Patent Application Laid-Open No. 59-081947, a packet transmission method, in which a certain packet length is previously stored in a packet switching center, is described. In the packet transmission method, when a length of data is shorter than the packet length stored in a packet switching center, the data are combined to generate a packet having a data length equivalent to the packet length stored in the packet switching center. Then the packet is transmitted. In the packet transmission method respectively described in the above patent application, however, the transmission needs to be suspended until generated data reaches a predetermined packet length. Accordingly, the transmission path is not efficiently used, and thereby the throughput is lowered.

In Japanese Patent Application Laid-Open No. 2004-032283, a transmission apparatus and a receiving apparatus are described as follows. The transmission apparatus transmits a transmission packet having an error tolerance based on a receiving condition of the transmission packet and a condition of a transmission path. From the transmission apparatus, the receiving apparatus obtains information including receiving intervals, a number of discarded packet, throughputs and the like, on the transmission packet. The receiving apparatus then transmits the obtained results to the transmission apparatus. On the basis of the obtained results, the transmission apparatus determines an interleave length or a payload length of packet to be transmitted therefrom. As described above, the transmission apparatus described in this patent application, transmits a transmission packet in accordance with the receiving condition and the condition of the transmission path. This makes it possible to reduce the processing load of the receiving apparatus. The transmission apparatus described in this patent application document, reads data having a length equivalent to one frame, and divides the data by the payload length according to the result of determination made by a parameter determination unit. Then the transmission apparatus transmits the divided data. This improves the transfer efficiency. However, since the data is divided, and thus is transferred, a number of header to be added to the data to be transmitted increases. For this reason, the total amount of information included in the data to be transmitted increases, and thus the throughput is lowered. Moreover, depending on the timings of reading and transmission of data, the transmission of data may need to be suspended.

In Japanese Patent Application Laid-Open No. 11-234347, a buffer management method is described. In this method, the efficiency of data transmission is improved by avoiding the state of waiting for transmission due to a shortage of the available capacity of a receiving buffer. A data transmission apparatus described in this patent application, transmits information on a size of data to be transmitted together with a signal for checking the available capacity of the receiving buffer, to a receiving apparatus. According to the response from the data receiving apparatus, in a case where the size of the available capacity is equal to or larger than the size of the data to be transmitted, the transmission apparatus collectively transmits the data, when the size of the available capacity is smaller than the size of the data to be transmitted, the transmission apparatus divides the data into pieces each having a size matching the available capacity. Then the transmission apparatus transmits the pieces of data. However, since the data is divided, and thus transmitted, a number of header to be added to the data increases. Accordingly, a total amount of information included in the data increases, and thereby the throughput is lowered.

SUMMARY OF THE INVENTION

An object of the present invention is to provide a data transfer circuit, a system and a data transfer method, which are capable of transferring packets with a high throughput by efficiently using transmission paths between processing unit.

In addition, another object of the invention is to provide a data transfer circuit, a system, and a data transfer method, which are capable of efficiently merging flits of reply data.

A circuit connected to a data transmission path, said circuit comprising: a merge element which generates merged data by merging a plurality of incoming data; and a controller which transmits said merged data through said data transmission path when said data transmission path comes open.

A circuit comprising: a merge element which generates merged data by merging a plurality of incoming data; a memory element which has a plurality of storage areas each temporarily storing one of said incoming data included in said merged data; a controller which transmits a permission signal, permitting said merge element to transmit said merged data through said memory element, to said merge element; an output controller which calculates a first number, corresponding to a number of available storage area of a destination of said merged data; and wherein said controller transmits said permission signal when said first number is equal to or larger than a second number indicating a number of said incoming data included in said merged data.

A circuit comprising: a merge element which generates merged data by merging a plurality of incoming data; a memory element which has a plurality of storage areas each temporarily storing one of said incoming data included in said merged data; a controller which transmits a permission signal, permitting said merge element to transmit said merged data through said memory element, to said merge element; a first number storing element which stores a first number obtained by adding one to a number of clock cycle required when said merge element transmits said merged data to said memory element after receiving said permission signal; a calculating element which calculates a second number corresponding to a number of said storage area in which said incoming data is stores; and wherein said controller transmits said permission signal when said first number is equal to or larger than said second number.

A circuit comprising: a merge element which generates merged data by merging a plurality of incoming data; a memory element which has a plurality of storage areas each temporarily storing one of said incoming data included in said merged data transmitted from said merge element; a controller which transmits a permission signal, permitting said merge element to transmit said merged data through said memory element, to said merge element; an output controller which calculates a first number, corresponding to a number of available storage area of a destination of said merged data; wherein said controller compares said first number with a second number corresponding to a number of said incoming data included in said merged data; a third number storing element which stores a third number obtained by adding one to a number of clock cycle required when said merge element transmits said merged data to said memory element after receiving said permission signal; a calculating element which calculates a fourth number corresponding to a number of said storage area in which said incoming data is stores; and wherein said controller transmits said permission signal, when said first number is equal to or larger than said second number and said third number is equal to or larger than said fourth number.

A method for controlling a circuit connected to a data transmission path, said method comprising: generating merged data by merging a plurality of incoming data, by a merge element; and transmitting said merged data through said data transmission path when said data transmission path comes open.

BRIEF DESCRIPTION OF THE DRAWINGS

Other features and advantages of the invention will be made more apparent by the following detailed description and the accompanying drawings, wherein.

In the drawings, the same reference numerals represent the same structural elements.

DESCRIPTION OF THE PREFERRED EMBODIMENT

An embodiment of the present invention will be described in detail below.

Hereinafter, an embodiment of a data transfer circuit according to the present invention will be explained with reference to the accompanying drawings.

The same reference numerals represent the same structural elements.

Descriptions of the data transfer circuit according to the present invention will be given, with reference to a packet transmission circuit 20-1 described in FIG. 1, as an example. The packet transmission circuit 20-1 is provided between a processing unit 10-1 and an I/O controller 30-1. The processing unit 10-1 transmits reply data R to the I/O controller 30-1 in response to a read request issued from the I/O controller 30-1. At this time, the processing unit 10-1 divides the reply data R into flits each having an amount that the processing unit 10-1 is capable of transmitting within one clock cycle (for example, flits F0 to Fm). The processing unit 10-1 then transmits each of the flits to the packet transmission circuit 20-1 per clock cycle as an incoming flit Ri. The packet transmission circuit 20-1 according to the present invention merges the incoming flits Ri corresponding to the clock cycles, in the order of input. Then, the packet transmission circuit 20-1 transmits merged data Rm to the I/O controller 30-1. At this time, the packet transmission circuit 20-1 does not wait for input of all the flits F0 to Fm in the reply data R which corresponds to the read request. Here, a number of flit in the merge data Rm is any number. The number is determined depending on availability conditions of a transmission path to the I/O controller 30-1 (conditions of an available capacity of an input buffer 31 in the I/O controller 30-1 or reply data stored in a buffer 5 in advance.) Hereinafter, descriptions of the embodiment will be given in detail.

Figure 1:
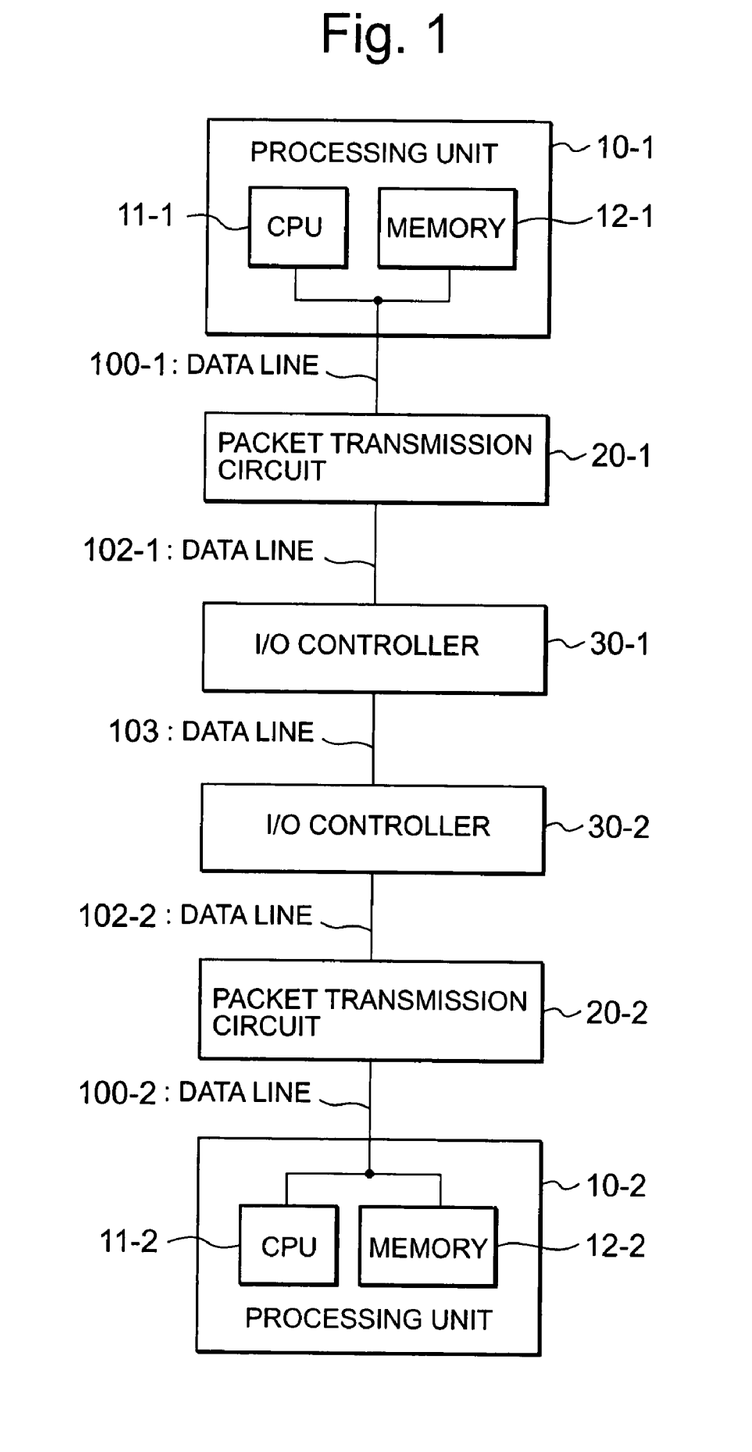
FIG. 1 is a block diagram showing a configuration of a system according to the present invention.

FIG. 1 is a block diagram showing a configuration of a system including the packet transmission circuits 20-1 and 20-2 of the present invention. The system according to the present invention includes the processing units 10-1 and 10-2, the packet transmission circuits 20-1 and 20-2, and the input/ output control circuits (I/O controllers) 30-1 and 30-2. Each of the processing units 10-1 and 10-2, is an arithmetic processing apparatus including a CPU 11 (11-1 or 11-2) and a memory 12 (12-1 or 12-2) which are interconnected with each other via a bus. Each of the input/output control circuits (I/O controllers) 30-1 and 30-2 controls the inputting and outputting of packet data to the corresponding processing units 10-1 or 10-2. The processing units 10-1 and 10-2 are connected respectively with the packet transmission circuits 20-1 and 20-2 via corresponding data lines 100-1 and 100-2. The packet transmission circuits 20-1 and 20-2 are connected respectively with the I/O controllers 30-1 and 30-2 via corresponding data lines 102-1 and 102-2. Moreover, the I/O controllers 30-1 and 30-2 are connected with each other via a data line 103.

Here, it is assumed that a maximum data length that the processing unit 10-1 is capable of processing is smaller than a maximum data length that the processing unit 10-2 is capable of processing. Descriptions below will be given with taking the following operation as an example. In the operation, the CPU 11-1 of the processing unit 10-1 reads the reply data R from the memory 12-1 in response to a read request from the processing unit 10-2. Then, the CPU 11-1 transmits the read reply data R to the processing unit 10-2 through the packet transmission circuit 20-1.

The CPU 11-1 of the processing unit 10-1 divides the reply data R to be transmitted, into flits each having an amount corresponding to a transmission capacity of the data line 100-1. Then, the CPU 11-1 transmits each of the flits to the packet transmission circuit 20-1 as an incoming flit Ri in synchronism with a clock cycle. The packet transmission circuit 20-1 generates merged data Rm by merging the incoming flits Ri in order of receiving the incoming flits Ri. The packet transmission circuit 20-1 transmits the merged data Rm to the I/O controller 30-1 as packet data. The I/O controller 30-1 temporarily stores the transferred packet data in an input buffer 31-1. The I/O controller 30-1 then transmits the packet data to the processing unit 10-2 through the I/O controller 30-2 on the basis of the header of the packet data. At this time, the packet transmission circuit 20-2 on the processing unit 10-2 side divides the transferred packet data into flits corresponding to the transmission capacity of the data line 100-2. Then the packet transmission circuit 20-2 transmits the divided packet data to the processing unit 10-2. The CPU 11-2 of the processing unit 10-2 stores the transferred packet data in the memory 12-2.

Figure 2:
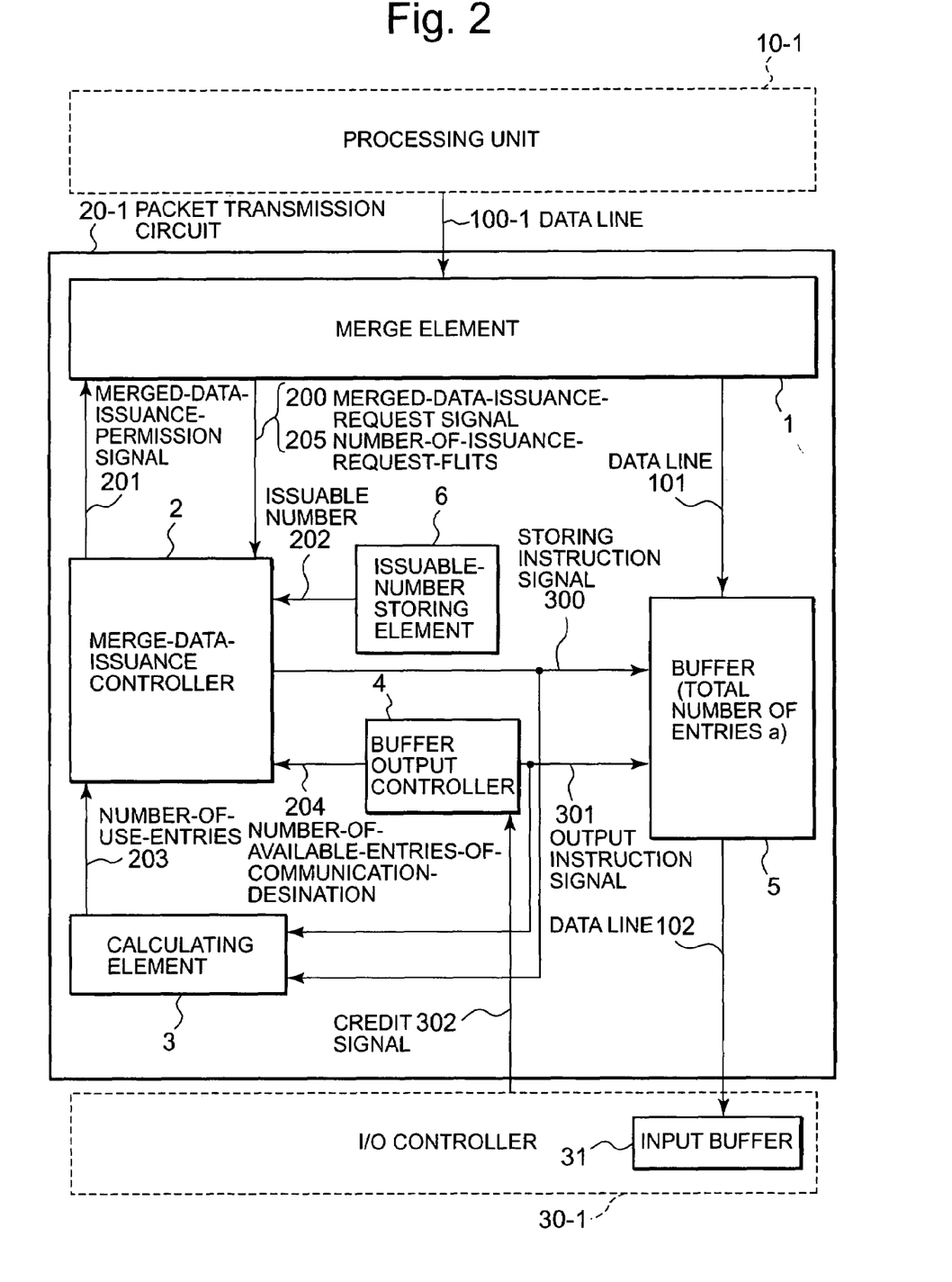
FIG. 2 is a block diagram showing a configuration of a packet transmission circuit according to the present invention.

FIG. 2 is a block diagram showing a configuration of the packet transmission circuit 20-1 of the present invention. The packet transmission circuit 20-2 has a same configuration shown in FIG. 2. Descriptions will be given of the details of a configuration of the packet transmission circuit 20-1 of the present invention by referring to FIG. 2. In the descriptions, the packet transmission circuit 20-1, which is connected to the processing unit 10-1, is taken as an example of circuit which transmits data. The packet transmission circuit 20-1 includes a merge element 1, a merged-data-issuance controller 2, a calculating element 3, a buffer output controller 4, a buffer 5 and an issuable-number storing element 6. The merge element 1 is connected to the processing apparatus 10-1 through a data line 100-1, and the buffer 5 is connected to the I/O controller 30-1 through the data line 102-1

The merge element 1 generates merged data Rm by merging the incoming flits Ri in the order of receiving the incoming flits Ri which is transmitted from the processing unit 10-1 through the data line 100-1. The merge element 1 issues a merged-data-issuance-request signal 200 to the merged-data-issuance controller 2 every time the incoming flit Ri is inputted thereto. The merged-data-issuance-request signal 200 includes information indicating a number of flit included in the merged data Rm. Hereinafter, the information is referred to as a number-of-issuance-request-flits 205. Here, one flit is transmitted in one clock cycle. And, an amount of one flit corresponds to an amount of an entry of a buffer 5. The merge element 1 transmits the merged data Rm to the buffer 5 through a data line 101-1, in response to a merged-data-issuance-permission signal 201 issued by the merged-data-issuance controller 2.

In response to a storing instruction signal 300 issued by the merged-data-issuance controller 2, the buffer 5 stores the merged data Rm transmitted from the merge element 1 through the data line 101-1. In addition, the merged data Rm is transmitted to the I/O controller 30-1 through the data line 102-1, in response to an output instruction signal 301 issued by a buffer output controller 4.

A issuable-number storing element 6 stores a issuable number 202. The issuable number 202 is a transmission condition of the merged data Rm. This transmission condition is set in order to minimize the waiting time of subsequent merged data Rm when preceding merged data Rm has been stored in the buffer 5 in advance. The issuable number 202 is preferably set so that the preceding merged data Rm transmitted to the buffer 5 in advance and the subsequent merged data Rm can be sequentially transmitted without an interval from the buffer 5 to the I/O controller 30-1. Specifically, the issuable number 202 is set so as to allow the following transmissions. That is, the leading flit F of the subsequent merged data Rm is transmitted from the buffer 5 one clock cycle after the last flit F of the preceding merged data Rm is transmitted.

Here, the number of clock cycle required when the merge element 1 transmits the leading flit of the merged data Rm to the buffer 5 after the merged-data-issuance-permission signal 201 is issued, is set in the merge element 1. Accordingly, the issuable number 202 means a number which is calculated by adding one to the number of clock cycle required when the merge element 1 transmits the merged data Rm to the buffer 5 through the data line 101-1 after the merged-data-issuance-permission signal 201 is issued. Here, one flit corresponds to one entry of the buffer 5. The issuable-number storing element 6 outputs the issuable number 202 to the merged-data-issuance controller 2.

The buffer output controller 4 receives a credit signal 302 transmitted from the I/O controller 30-1 of the communication destination, and calculates the number of available entries (hereinafter, referred to as number-of-available-entries-of-communication-destination 204) of the input buffer 31 in the I/O controller 30-1 of the communication destination. The credit signal 302 includes information on an area in use in the input buffer 31 of the I/O controller 30-1 (for example, an address of the area in use or a number of entry in use). The buffer output controller 4 retains information on the area of the input buffer 31 of the I/O controller 30-1 of the communication destination (for example, address information or a total number of entry). The buffer output controller 4 calculates the number-of-available-entries-of-communication-destination 204 based on the information on the area in use of the input buffer 31, and the information on the area of the input buffer 31. The buffer controller 4 also outputs the calculated number-of-available-entries-of-communication-destination 204 to the merged-data-issuance controller 2. Furthermore, based on a number of available entry of the input buffer 31, the buffer output controller 4 determines whether or not it is possible to transmit the merged data Rm stored in the buffer 5 to the input buffer 31. When it is possible to transmit the merged data Rm, the buffer output controller 4 outputs the output instruction signal 301 to the buffer 5 and the calculating element 3. When the buffer 5 receives the output instruction signal 301, the buffer 5 transmits the flits F stored therein to the I/O controller 30-1 per clock cycle.

The calculating element 3 calculates a number of entry in use in the buffer 5 (hereinafter, referred to as number-of-use-entries 203) on the basis of the storing instruction signal 300 and the output instruction signal 301. The calculating element 3 then outputs the number-of-use-entries 203 to the merged-data-issuance controller 2. The calculating element 3 calculates a number of entry planned to be used in the buffer 5, based on a storing destination information included in the storing instruction signal 300. The storing destination information means, for example, an address of the buffer 5 or the number of entry of the buffer 5. The calculating element 3 also calculates a number of entry to be newly available, based on an availability information included in the output instruction signal 301. The availability information means, for example, an address that data is planned to be transmitted therefrom, or a number of entry that data is planned to be transmitted therefrom. The calculating element 3 calculates the latest number-of-use-entries 203 on the basis of the number of entry planned to be used and the number of entry to be available, and the number-of-use-entries 203 which is calculated last time. For example, the calculating element 3 calculates the latest number-of-use-entries 203 as follows. First, the calculating element 3 adds the number-of-use-entries 203, which has been calculated the last time, to the number of entry planned to be used. Then, the calculating element 3 subtracts the number of entry to be available from the resultant number of the addition.

The merged-data-issuance controller 2 determines, upon input of the merged-data-issuance-request signal 200, whether or not to transmit the merged data Rm to the I/O controller 30-1. The merged-data-issuance controller 2 determines based on the number-of-issuance-request-flits 205, the issuable number 202, the number-of-use-entries 203, and the number-of-available-entries-of-communication-destination 204. The merged-data-issuance controller 2 transmits the merged-data-issuance-permission signal 201 to the merge element 1 when the issuable number 202 is equal to or larger than the number-of-use-entries 203, and the number-of-available-entries-of-communication-destination 204 is equal to or larger than the number-of-issuance-request-flits 205.

Figure 3:
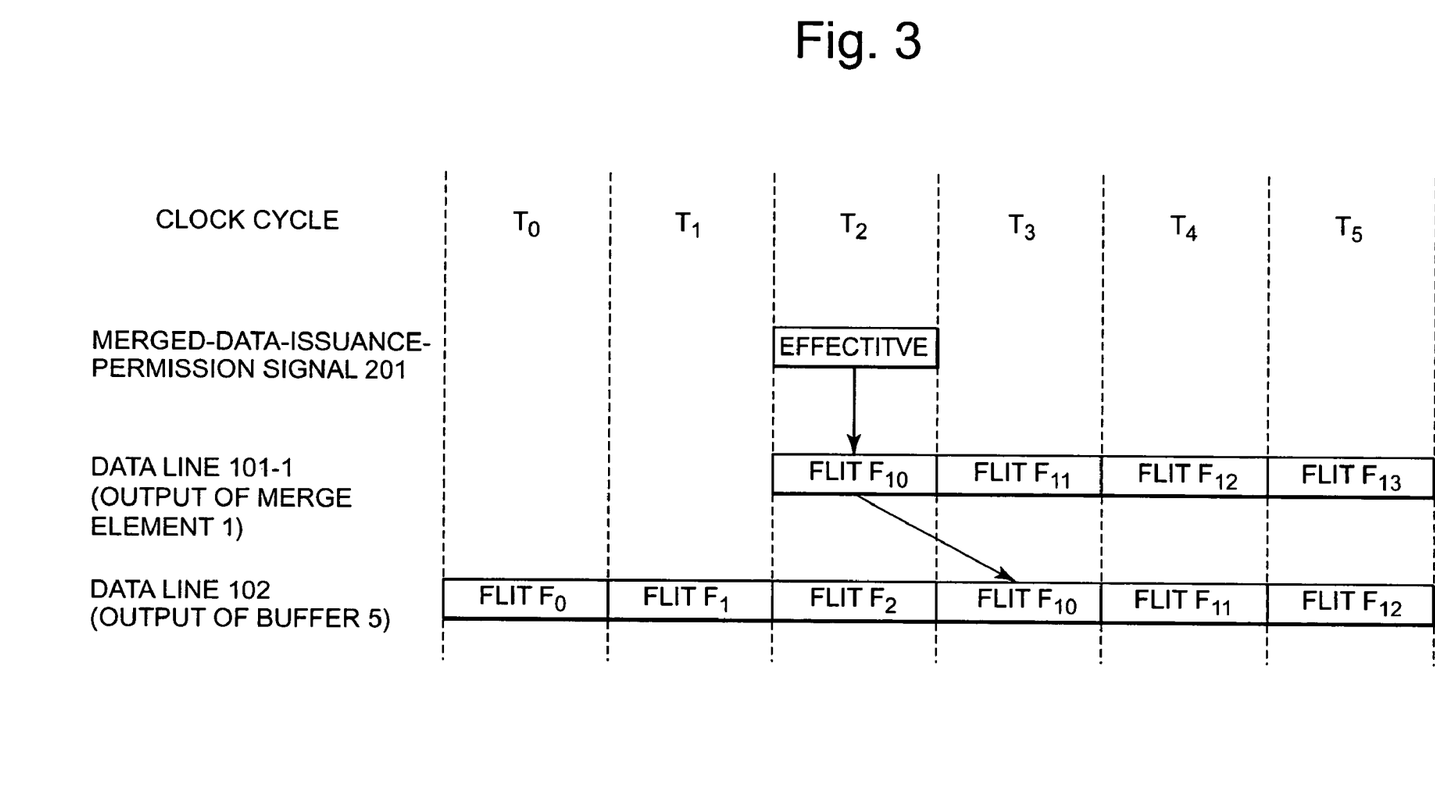
FIG. 3 is a timing chart showing timing for outputting merged data.
Figure 4:
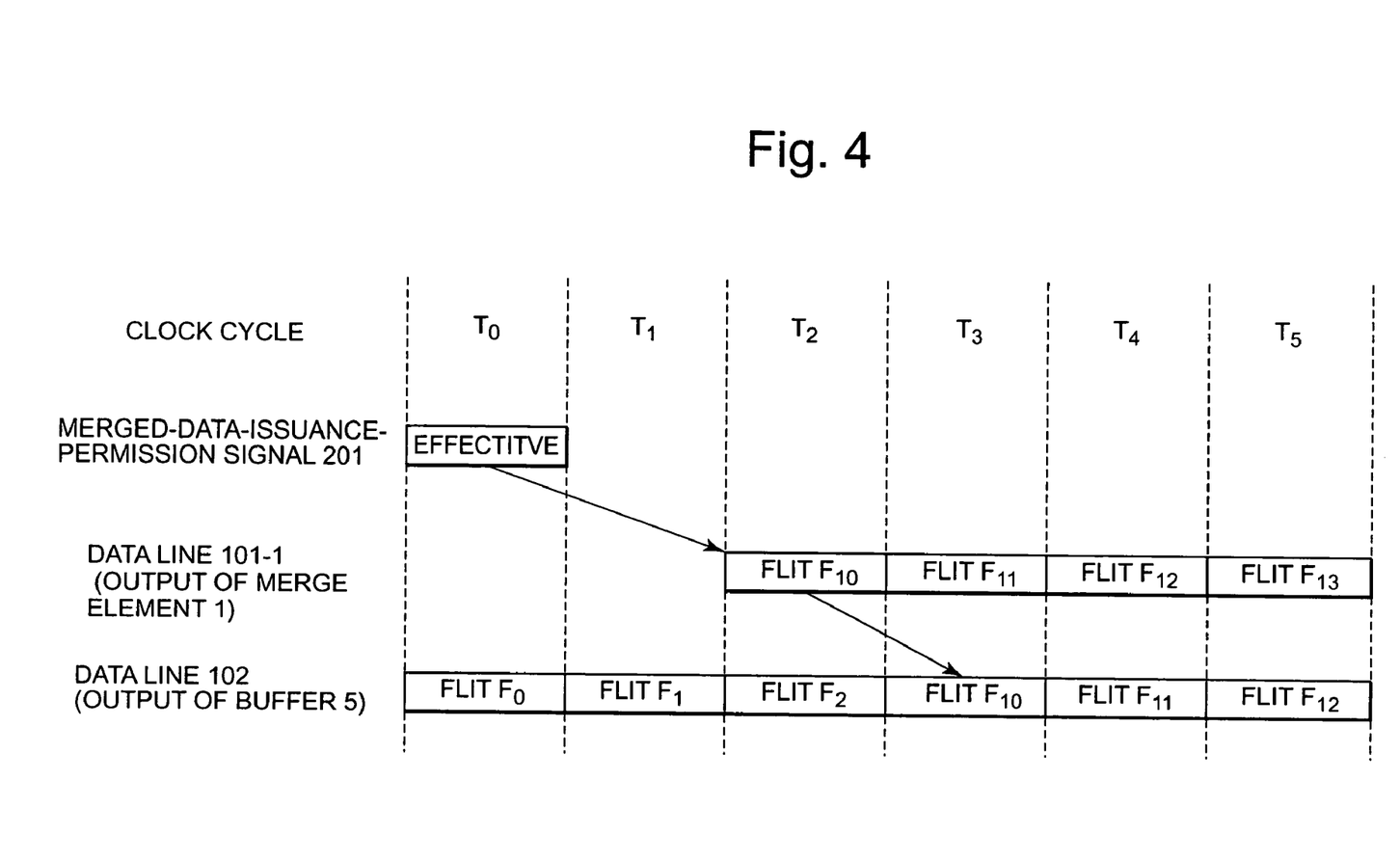
FIG. 4 is a timing chart showing timing for outputting merged data.

Here, the setting of the issuable number 202 is described in detail with reference to FIGS. 3 and 4. FIGS. 3 and 4 are timing charts respectively showing output timings of merge data Rm to be transmitted from the merge element 1 in response to the merged-data-issuance-permission signal 201. Here, the merged data Rm stored in the buffer 5 in advance is referred to as a preceding merged data R1, and the merged data Rm to be transmitted to the buffer 5 subsequently to the preceding merge data R1 is referred to as a subsequent merged data R2. It is assumed that the preceding merged data R1 includes flits F0, F1 and F2, and that the subsequent merged data R2 includes flits F10, F11, F12 and F13. Descriptions as to a case where the preceding merged data R1 is outputted from the buffer 5 to the data line 102 when the clock cycle is T0 are given hereinafter.

FIG. 3 is a timing chart showing output timings of the preceding merged data R1 and the subsequent merged data R2 when the issuable number 202 is set at "1". With reference to FIG. 3, in a case where the merge element 1 can transmit the leading flit F10 of the subsequent merged data R2 to the buffer 5 at the same time when the merged-data-issuance-permission signal 201 is issued (clock cycle T2), the issuable number 202 is set at "1".

FIG. 4 is a timing chart showing output timings of the preceding merged data R1 and the subsequent merged data R2 when the issuable number 202 is set at "3". With reference to FIG. 4, in a case where the merge element 1 can transmit the leading flit F10 of the subsequent merged data R2 to the buffer 5 two clock cycles after the clock cycle T0 in which the merged-data-issuance-permission signal 201 is issued, the issuable number 202 is set at "3".

The merged-data-issuance controller 2 issues the merged-data-issuance-permission signal 201 when the issuable number 202 is equal to or larger than the number-of-use-entries 203. Accordingly, with reference to FIG. 3, in a case where the issuable number 202 is set at "1", the merged-data-issuance-permission signal 201 is issued when one flit F2 of the preceding merged data R1 is stored in the buffer 5. In a similar manner, with reference to FIG. 4, in a case where the issuable number 202 is set at "3", the merged-data-issuance-permission signal 201 is issued when three flits (F0, F1 and F2) of the preceding merged data R1 are stored in the buffer 5. Since the merged-data-issuance-permission signal 201 is issued in such a timing described above, the following merged data Rm is transferred to the I/O controller 30-1 from the buffer 5 without waiting in the buffer 5. Accordingly, since the waiting time does not exist, the time required for the merging process in the merge element 1 increases, and thus the more incoming flits Ri can be merged.

Hereinafter, a packet transfer operation by the packet transmission circuit 20 of the present invention will be described with reference to FIGS. 3 to 9. Here, descriptions as to a case where the reply data R is transmitted from the processing unit 10-1 to the I/O controller 30-1 in response to a read request issued from the processing unit 10-2, will be given as an example.

Figure 5:
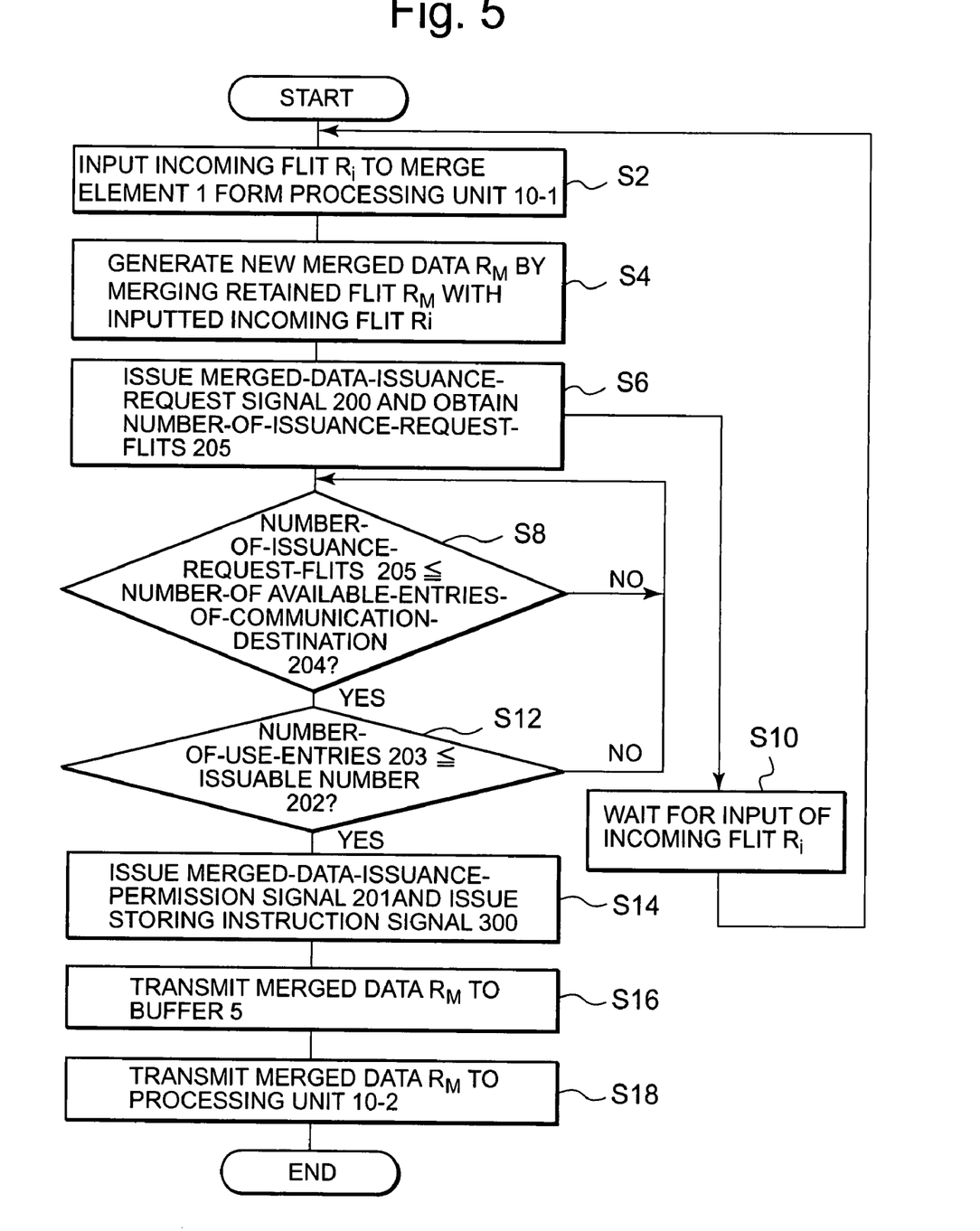
FIG. 5 is a flowchart showing a packet transfer operation.

FIG. 5 is a flowchart showing the packet transfer operation by the packet transmission circuit 20 of the present invention. The CPU 11-1 of the processing unit 10-1 extracts the reply data R from the memory 12-1 in response to the read request and then transmits the extracted reply data R to the packet transmission circuit 20-1. At this time, the CPU 11-1 divides the reply data R into the flits F0 to Fm. Then, the CPU 11-1 transmits each of the flits F0 to Fm to the packet transmission circuit 20-1 as the incoming flit Ri per clock cycle (step S2).

Each of the flits is transmitted from the processing unit 10-1 to the merge element 1 through the data line 100-1. The merge element 1 generates the merged data Rm by merging the incoming flits Ri in order of input (step S4). Next, the merge element 1 issues a number of flit included in the merge data Rm as the number-of-issuance-request-flits 205 to the merged-data-issuance controller 2 (step S6). The number-of-issuance-request-flits 205 is included in the data issuance request signal 200. The merged-data-issuance controller 2 determines whether or not to transmit the merged data Rm from the merge element 1 to the buffer 5, upon input of the merged-data-issuance-request signal 200 (steps S8 and S12). After issuing the merged-data-issuance-request signal 200, the merge element 1 waits for an input of the incoming flits Ri in parallel with this determination process (step S10). Thereafter, upon input of the incoming flits Ri in next clock cycle, the merge element 1 generates the merged data Rm by merging the incoming flits Ri again (steps S2 and S4). In the manner described above, the merge element 1 repeats the processes from step S2 to step S10, and merges the incoming flits Ri in order of input. Accordingly, the merge element 1 issues the merged-data-issuance-request signal 200 every time the merged data Rm is generated.

The merged-data-issuance controller 2 executes an issuance determination, process (step S8, S12). In the issuance determination process (step S8), the number-of-issuance-request-flits 205 is compared with the number-of-available-entries-of-communication-destination 204 indicating the number of available entry of the input buffer 31. In the issuance determination process (step S12), the issuable number 202 is compared with the number-of-use-entries 203 indicating the number of entry in use in the buffer 5. The results of each issuance determination process consist of two statuses: "wait" and "issue." The merged-data-issuance controller 2 determines that the result is "wait," and does not issue the merged-data-issuance-permission signal 201, when the number-of-use-entries 203 is larger than the issuable number 202 (No in step S12), or when the number-of-issuance-request-flits 205 is larger than the number-of-available-entries-of-communication-destination 204 (No in step 8). Then, in response to the merged-data-issuance-request 200 to be subsequently issued, the merged-data-issuance controller 2 determines whether or not to transmit the merged data again (steps S8 and S12).

The merged-data-issuance controller 2 determines that the results "issue," when the number-of-use-entries 203 is equal to or larger than the issuable number 202 (Yes in step S12), and when the number-of-issuance-request-flits 205 is equal to or larger than the number-of-available-entries-of-communication-destination 204 (Yes in step 8). When the result is "issue," the merged-data-issuance controller 2 issues the merged-data-issuance-permission signal 201 to the merge element 1 (step S14). At the same time, the merged-data-issuance controller 2 issues the storing instruction signal 300 to the buffer 5 (step S14). In response to the merged-data-issuance-permission signal 201, the merge element 1 adds a header to the merged data Rm, and then transmit the merged data Rm to the buffer 5 (step S16). Moreover, the buffer output controller 4 issues an output instruction signal 301 to the buffer 5, depending on the available capacity of the input buffer 31 of the I/O controller 30-1. With the output instruction signal 301, the merged data Rm stored in the buffer 5 is transmitted to the I/O controller 30-1 through the data line 102 (step S18). As described above, by repeating the processes from step S2 to step S18, the packet transmission circuit 20-1 transmits the flits (F0 to Fm) of the reply data R which corresponds to the read request from the I/O controller 30-1 to the I/O controller 30-1.

Figure 6:
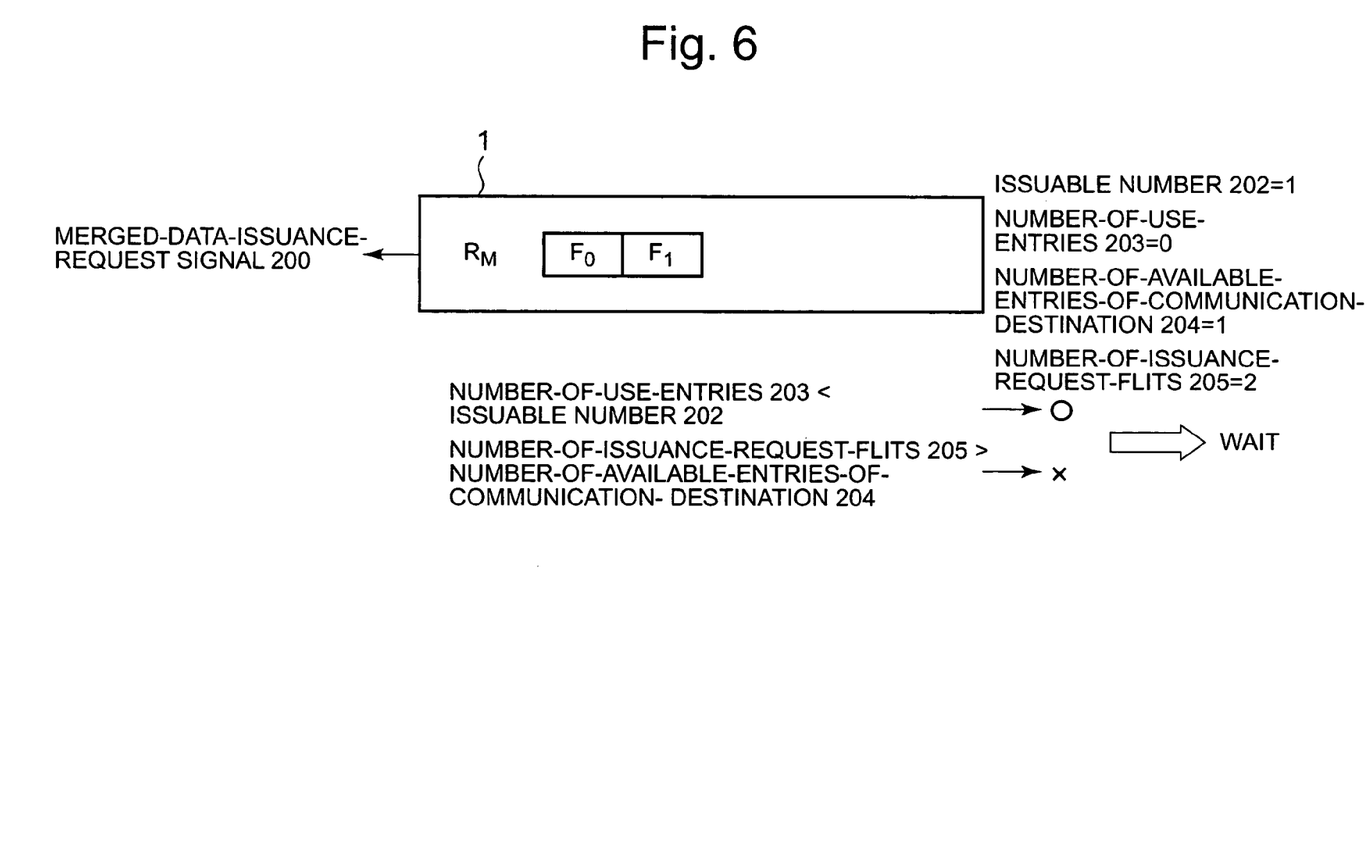
FIG. 6 is a diagram showing an example of a process for determining whether or not merged data are issued.
Figure 7:
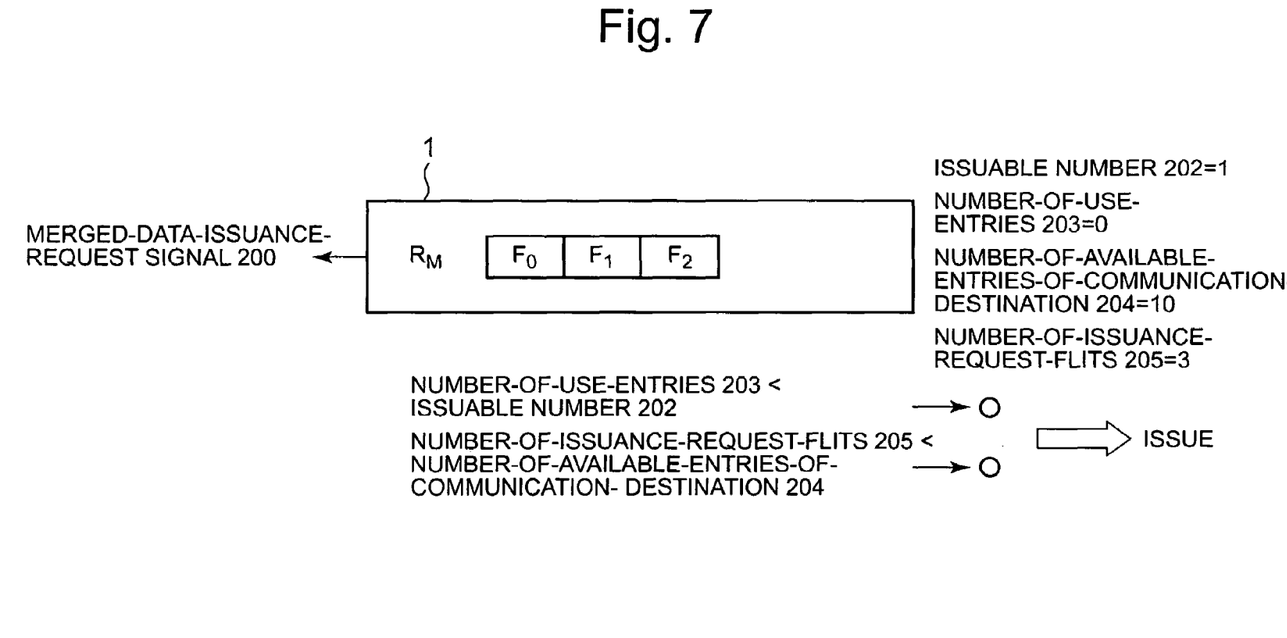
FIG. 7 is a diagram showing an example of a process for determining whether or not merged data are issued.

The processes of making the determination of issuance in the merged-data-issuance controller 2 of the present invention will be described with reference to FIGS. 6 to 9. Here, it is assumed that the merge element 1 is able to transmit the merged data Rm to the buffer 5 at the same time when the merged-data-issuance-permission signal 201 is issued. Specifically, the issuable number 202 is set at "1". FIGS. 6 to 9 are diagrams each showing an example of the process of making the determination of issuance in the merged-data issuance controller 2 when the issuable number 202 is set at "1". FIGS. 6 and 7 are diagrams each showing an example of the process of making the determination of issuance when the merged data Rm is not stored in the buffer 5 (the number-of-use-entries 203 is "0").

With reference to FIG. 6, upon input of the flit F1 to the merge element 1 as the incoming flit Ri, the merge element 1 generates the merged data Rm by merging the flit F1 with the flit F0 having inputted thereto in advance. In addition, the merge element 1 issues the number of flit included in the merged data Rm as the number-of-issuance-request-flits 205. The number-of-issuance-request-flits 205 is included in the merged-data-issuance-request signal 200. The merge element 1 issues the merged-data-issuance-request signal 200 including with the number-of-issuance-request-flits 205. In this case, the number-of-issuance-flits 205 is "2". The merge element 1 issues the merged-data-issuance-request signal 200 to the merged-data-issuance controller 2. At this time, it is assumed that the merged-data-issuance controller 2 has obtained the number-of-available-entries-of-communication-destination 204, which is "1", from the buffer output controller 4. In response to the merged-data-issuance-permission signal 200, the merged-data-issuance controller 2 compares the issuable number 202 with the number-of-use-entries 203. Here, the issuable number 202 is "1", and the number-of-use entries 203 is "0". Moreover, the merged-data-issuance controller 2 compares the number-of-available-entries-of-communication-destination 204 with the number-of-issuance-request-flits 205. Here, it is assumed that the number-of-available-entries-of-communication-destination 204 is "1", and the number-of-issuance-request-flits 205 is "2". In this case, the number-of-issuance-request-flits 205 is larger than the number-of-available-entries-of-communication-destination 204. Accordingly, the result of the determination is "wait.". The merged-data-issuance controller 2 thus waits the issuance of the merged-data-issuance-permission signal 201.

With reference to FIG. 7, upon further input of the flit F2 to the merge element 1 as the incoming flit Ri, the merge element 1 generates new merged data Rm by merging the inputted flit F2 with the merged data Rm (which have been generated by merging the flit F0 with F1). In addition, the merge element 1 issues the number of flit included in the merged data Rm as the number-of-issuance-request-flits 205. The number-of-issuance-request-flits 205 is included in the merged-data-issuance-request signal 200. The merge element 1 issues the merged-data-issuance-request signal 200 including with the number-of-issuance-request-flits 205. The number-of-issuance-request-flits 205 is "3". At this time, it is assumed that the merged-data-issuance controller 2 has obtained the number-of-available-entries-of-communication-destination 204 from the buffer output controller 4. Here, it is assumed that the number-of-available-entries-of-communication-destination 204 is "10". In response to the merged-data-issuance-request signal 200, the merged-data-issuance controller 2 compares the issuable number 202 with the number-of-use-entries 203. Here, the issuable number 202 is "1", and the number-of-use-entries 203 is "0". Moreover, the merged-data-issuance controller 2 compares the number-of-available-entries-of-communication-destination 204 with the number-of-issuance-request-flits 205. Here, the number-of-available-entries-of-communication-destination 204 is "10", and the number-of-issuable-request-flits 205 is "3". In this case, the number-of-use-entries 203 is smaller than the issuable number 202, and also the number-of-issuable-request-flits 205 is smaller than the number-of-available-entries-of-communication-destination 204. Accordingly, the result of the determination is "issue.". The merged-data-issuance controller 2 issues the merged-data-issuance-permission signal 201 to the merge element 1. Upon receipt of the merged-data-issuance-permission signal 201, the merge element 1 sequentially transmits the flits (F0 to F2) in the merged data Rm to the buffer 5, respectively in synchronism with clock cycles.

Figure 8:
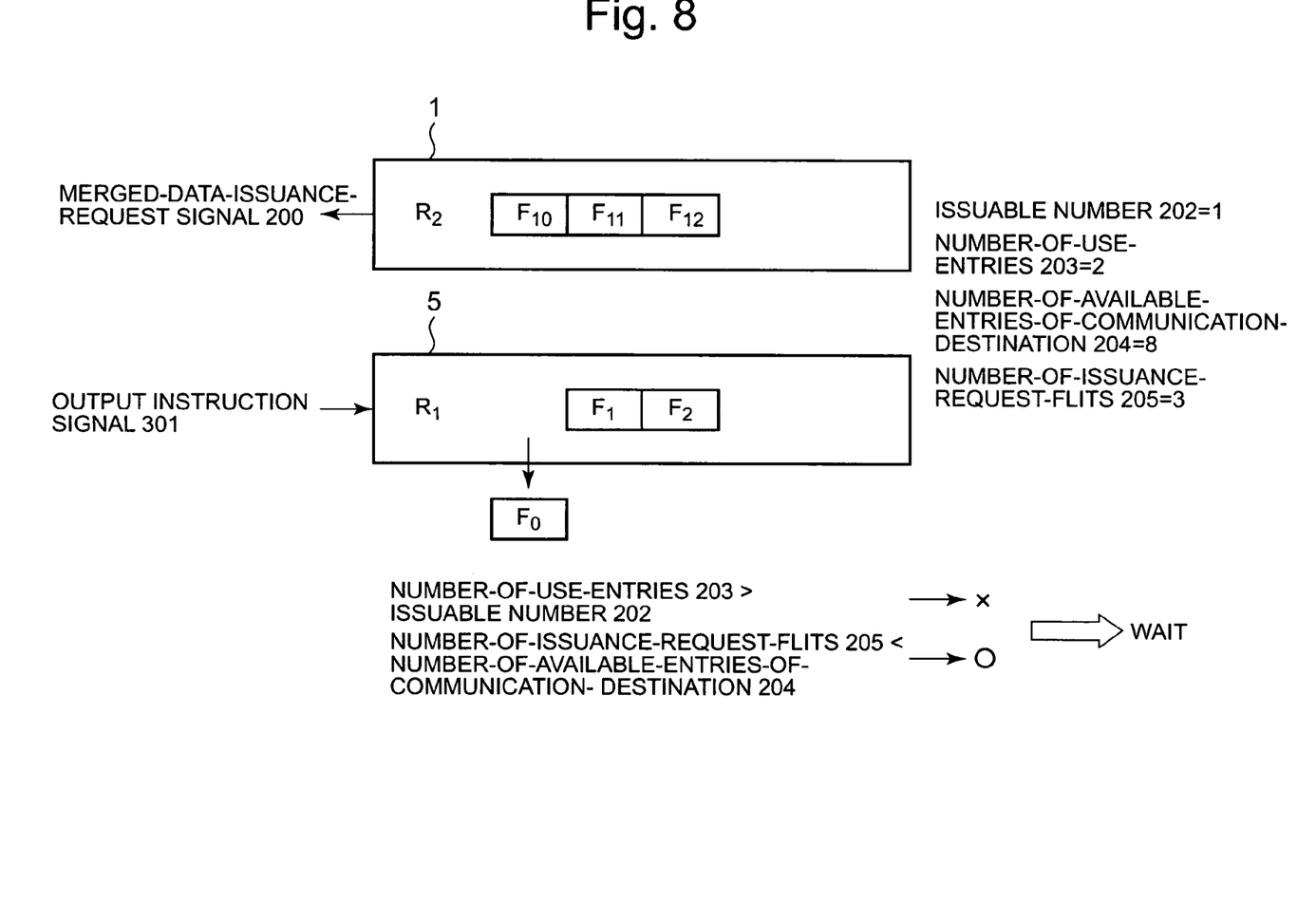
FIG. 8 is a diagram showing an example of a process for determining whether or not merged data are issued.
Figure 9:
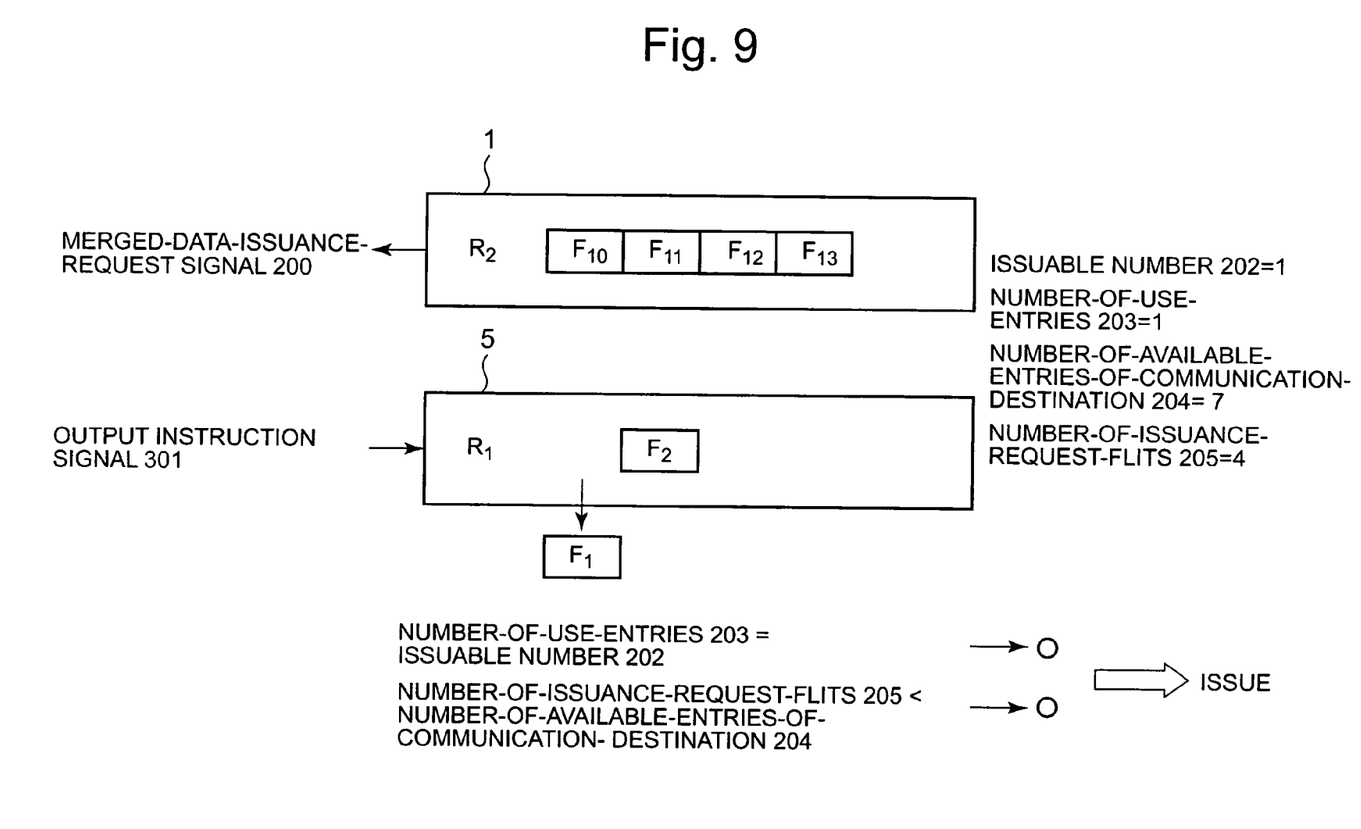
FIG. 9 is a diagram showing an example of a process for determining whether or not merged data are issued.

FIGS. 8 and 9 are diagrams each showing an example of the process of the determination of issuance when the merged data Rm has already been stored in the buffer 5. Here, it is assumed that the merged data Rm, which has been already stored in the buffer 5, is the preceding merged data R1 (flits F0 to F2), and the merged data Rm, which is to be stored in the buffer 5 subsequently, is the subsequent merged data R2.

With reference to FIG. 8, in synchronism with the clock cycle T0, the flit F12 is inputted to the merge element 1, and the flit F0 is transmitted to the I/O controller 30-1 from the buffer 5. The merge element 1 generates new merged data Rm (flits F10 to F12) by merging the inputted flit F12 with the merged data Rm (which have been generated by merging the flit F10 with F11). In addition, the merge element 1 issues the number of flit included in the merged data Rm as the number-of-issuance-request-flits 205. The number-of-issuance-request-flits 205 is included in the merged-data-issuance-request signal 200. The merge element 1 issues the merged-data-issuance-request signal 200 to the merged-data-issuance controller 2. The number-of-issuance-request-flit 205 is "3". The calculating element 3 calculates the number-of-use-entries 203, on the basis of the output instruction signal 301 for the flit F0, and the storing instruction signal 300 for the preceding merged data R1 (flits F0 to F2). Here, the calculated number-of-use-entries 203 is "2". In response to the merged-data-issuance-request signal 200, the merged-data-issuance controller 2 obtains the number-of-use-entries 203 from the calculating element 3, and the number-of-available-entries-of-communication-destination 204 from the buffer output controller 4. Here, the number-of-use-entries 203 is "2", and the number-of-available-entries-of-communication-destination 204 is "8". Subsequently, the merged-data-issuance controller 2 compares the issuable number 202 with the number-of-use-entries 203. The issuable number 202 is "1", and the number-of-use-entries 203 is "2". Moreover, the merged-data-issuance controller 2 compares the number-of-available-entries-of-communication-destination 204 with the number-of-issuance-request-flits 205. The number-of-available-entries-of-communication-destination 204 is "8", and the number-of-issuance-request-flits 205 is "3". In this case, the number-of-use-entries 203 is larger than the issuable number 202. Accordingly, the result of the determination is "wait." The merged-data-issuance controller 2 thus waits for the issuance of the merged-data-issuance-permission signal 201.

With reference to FIG. 9, in synchronism with next clock cycle T1, the flit F13 is inputted to the merge element 1, and at the same time, the flit F1 is transmitted to the I/O controller 30-1 from the buffer 5. The merge element 1 generates new merged data Rm (flits F10 to F13) by merging the inputted flit F13 with the merged data Rm (flits F10 to F12). In addition, the merge element 1 issues the number of flit included in the merged data Rm as the number-of-issuance-request-flits 205. The number-of-issuance-request signal 205 is included in the merged-data-issuance-request signal 200. The merge element 1 issues the merged-data-issuance-request signal 200 to the merged-data-issuance controller 2. At this time, the calculating element 3 calculates the number-of-use-entries 203, on the basis of the output instruction signal 301 for the flit F1, and the storing instruction signal 300 for the prior merged data R1 (flits F0 to F2). Here, the number-of-use-entries 203 is "1". In response to the merged-data-issuance-request signal 200, the merged-data-issuance controller 2 obtains the number-of-use-entries 203 from the calculating element 3 and the number-of-available-entries-of-communication-destination 204 from the buffer output controller 4. The number-of-use-entries 203 is "1", and the number-of-available-entries-of-communication-destination 204 is "7". Subsequently, in response to the merged-data-issuance-request signal 200, the merged-data-issuance controller 2 compares the issuable number 202 with the number-of-use-entries 203. The issuable number 202 is "1", and the number-of-use-entries 203 is "1". The merged-data-issuance controller 2 also compares the number-of-available-entries-of-communication-destination 204 with the number-of-issuance-request-flits 205. The number-of-available-entries-of-communication-destination 204 is "7", and the number-of-issuance-request-flits 205 is "4". In this case, the number-of-use-entries 203 is equal to the issuable number 202, and the number-of-issuance-request-flits 205 is smaller than the number-of-available-entries-of-communication-destination 204. Accordingly, the result of the determination is "issue." The merged-data-issuance controller 2 thus issues the merged-data-issuance-permission signal 201 to the merge element 1.

Here, the merged-data-issuance-permission signal 201 is issued in the clock cycle T2 following the clock cycle T1 in which the flit F13 is inputted to the merge element 1. Upon receipt of the merged-data-issuance-permission signal 201, the merge element 1 concurrently transmits the flit F10 of the merged data Rm to the buffer 5. The buffer 5 transmits the flit F2 to the I/O controller 30-1 in the same clock cycle T. Furthermore, in next clock cycle T3, the flit F11 is transmitted to the buffer 5, and the flit F10 is transmitted to the I/O controller 30-1. In the manner described above, the preceding merged data R1 (flits F0 to F2), and the subsequent merged data R2 (flits F10 to F13) are transmitted to the I/O controller 30-1 without intermittence.

As described above, when the result of the determination of issuance is "wait,", the merged-data-issuance-permission signal 201 is not transferred to the merge element 1, and the issuance of merged data Rm is waited at the merge element 1 until the conditions of determination in steps S8 and S12 are met. When the result of the determination of issuance is "issue," or when the status changes from "wait" to "issue,", data transmission is performed as follows. Upon input of the merged-data-issuance-permission signal 201, the merge element 1 transmits the merged data Rm, as packet data, to the processing unit 10-2 of communication destination through the buffer 5. Here, the merged data Rm has been generated by merging the flits up to the point of the input of the merged-data-issuance-permission signal 201.

As described above, when the result of the determination of issuance is "wait," the merged data Rm is not immediately transmitted from the merge element 1 to the data line 102. Accordingly, the more incoming flits Ri are merged. This makes it possible to efficiently process the merging of the data. In addition, the transmission of the merged data Rm is controlled on the basis of the number-of-use-entries 203 of the input buffer 31 in the I/O controller 301 of the transmission destination of the reply data R. This makes it possible to transmit the merged data Rm without lowering the throughput of the data line 102.

The data transmission circuit and the data transmission method according to the present invention make it possible to efficiently use the transmission path between processing unit. For this reason, packets can be transmitted with higher throughputs. Moreover, flits of reply data to be transmitted can be efficiently merged and transmitted.

While this invention has been described in conjunction with the preferred embodiments described above, it will now be possible for those skilled in the art to put this invention into practice in various other manners.

What is claimed is:

1. A circuit connected to a data transmission path, said circuit comprising:
 a merge element which generates merged data by merging a plurality of incoming data;
 a controller which transmits said merged data through said data transmission path when said data transmission path comes open; and a memory element which temporarily stores said merged data and is connected to said data transmission path, wherein said controller transmits said merged data through said memory element at a timing that leading incoming data of said merged data is extracted from said memory element one clock cycle after said leading incoming data is stored in said memory element, wherein said controller transmits a permission signal, permitting said merge element to transmit said merged data through said memory element, to said merge element at said timing, and wherein said controller detects said timing on a basis of a number of clock cycles required for said merge element to transmit said merged data to said memory clement after receiving said permission signal.

2. A circuit connected to a data transmission path, said circuit comprising:

a merge element which generates merged data by merging a plurality of incoming data;

a controller which transmits said merged data through said data transmission path when said data transmission path comes open; and a memory element which temporarily stores said merged data and is connected to said data transmission path, wherein said controller transmits said merged data through said memory element at a timing that leading incoming data of said merged data is extracted from said memory element one clock cycle after said leading incoming data is stored in said memory element, wherein said controller transmits a permission signal, permitting said merge element to transmit said merged data through said memory element, to said merge element at said timing, and wherein said controller transmits said permission signal to said merge element when a number obtained by adding one to a number of clock cycles required for said merge element to transmit said merged data to said memory element after receiving said permission signal is equal to or larger than a number of said incoming data stored in said memory element.

3. A circuit connected to a data transmission path, said circuit comprising:

a merge element which generates merged data by merging a plurality of incoming data;

a controller which transmits said merged data through said data transmission path when said data transmission path comes open; and a memory element which temporarily stores said merged data and is connected to said data transmission path, wherein said controller compares a first number corresponding to a number of available storage areas of a destination of said merged data with a second number corresponding to a number of said incoming data included in said merged data, wherein said controller compares a third number corresponding to a number obtained by adding one to a number of clock cycles required for said merge element to transmit said merged data to said memory element after receiving said permission signal with a fourth number corresponding to a number of said incoming data stored in said memory element, and wherein said controller transmits said merged data through said memory element, when said first number is equal to or larger than said second number and said third number is equal to or larger than said fourth number.

4. A circuit, comprising:

a merge element which generates merged data by merging a plurality of incoming data;

a memory element comprising a plurality of storage areas each temporarily storing one of said incoming data included in said merged data;

a controller which transmits a permission signal, permitting said merge element to transmit said merged data through said memory element, to said merge element;

a first number storing element which stores a first number obtained by adding one to a number of clock cycles required for said merge element to transmit said merged data to said memory element after receiving said permission signal; and a calculating element which calculates a second number corresponding to a number of said storage areas in which said incoming data is stored, wherein said controller transmits said permission signal when said first number is equal to or larger than said second number.

5. A circuit, comprising:

a merge element which generates merged data by merging a plurality of incoming data;

a memory element comprising a plurality of storage areas each temporarily storing one of said incoming data included in said merged data transmitted from said merge element;

a controller which transmits a permission signal, permitting said merge element to transmit said merged data through said memory element, to said merge element;

an output controller which calculates a first number, corresponding to a number of available storage areas of a destination of said merged data;

wherein said controller compares said first number with a second number corresponding to a number of said incoming data included in said merged data;

a third number storing element which stores a third number obtained by adding one to a number of clock cycles required for said merge element to transmit said merged data to said memory element after receiving said permission signal; and a calculating element which calculates a fourth number corresponding to a number of said storage areas in which said incoming data is stored, wherein said controller transmits said permission signal, when said first number is equal to or larger than said second number and said third number is equal to or larger than said fourth number.

6. A method for controlling a circuit connected to a data transmission path, said method comprising:

generating merged data by merging a plurality of incoming data by a merge element;

transmitting said merged data through said data transmission path when said data transmission path comes open;

storing said mated data temporarily in a memory element connected to said data transmission path;

transmitting said merged data through said memory clement at a timing that leading incoming data of said merged data is extracted from said memory element one clock cycle after said leading incoming data is stored in said memory element;

transmitting a permission signal, permitting said merge element to transmit said merged data through said memory element, to said merge element at said timing; and detecting said timing on a basis of a number of clock cycles required when said merge element transmits said merged data to said memory element after receiving said permission signal.

7. A method for controlling a circuit connected to a data transmission path, said method comprising:
- generating merged data by merging a plurality of incoming data by a merge element;
- transmitting said merged data through said data transmission path when said data transmission path comes open;
- storing said merged data temporarily in a memory element connected to said data transmission path;
- transmitting said merged data through said memory element at a timing that leading incoming data of said merged data is extracted from said memory element one clock cycle after said leading incoming data is stored in said memory element;
- transmitting a permission signal, permitting said merge element to transmit said merged data through said memory element, to said merge element at said timing; and
- transmitting said permission signal to said merge element when a number obtained by adding one to a number of clock cycles required when said merge element transmits said merged data to said memory element after receiving said permission signal is equal to or larger than a number of said incoming data stored in said memory element.

8. A method for controlling a circuit connected to a data transmission path, said method comprising:
- generating merged data by merging a plurality of incoming data by a merge element;
- transmitting said merged data through said data transmission path when said data transmission path comes open;
- storing said merged data temporarily in a memory element connected to said data transmission path;
- comparing a first number corresponding to a number of available storage areas of a destination of said merged data with a second number corresponding to a number of said incoming data included in said merged data;
- comparing a third number corresponding to a number obtained by adding one to a number of clock cycles required for said merge element to transmit said merged data to said memory element after receiving said permission signal with a fourth number corresponding to a number of said incoming data stored in said memory element; and
- transmitting said merged data through said memory element, when said first number is equal to or larger than said second number and said third number is equal to or larger than said fourth number.

* * * * *